Sept. 13, 1955 J. H. BATZLE 2,717,606
FEEDER ATTACHMENTS FOR WHOLE KERNEL CORN CUTTERS
Filed Nov. 14, 1951 3 Sheets-Sheet 1

INVENTOR.
JOSEPH HAROLD BATZLE
BY
Wheeler, Wheeler & Wheeler
ATTORNEYS

Sept. 13, 1955   J. H. BATZLE   2,717,606
FEEDER ATTACHMENTS FOR WHOLE KERNEL CORN CUTTERS
Filed Nov. 14, 1951   3 Sheets-Sheet 2

INVENTOR.
JOSEPH HAROLD BATZLE
BY
Wheeler, Wheeler & Wheeler
ATTORNEYS

Sept. 13, 1955　　　J. H. BATZLE　　　2,717,606
FEEDER ATTACHMENTS FOR WHOLE KERNEL CORN CUTTERS
Filed Nov. 14, 1951　　　3 Sheets-Sheet 3

INVENTOR.
JOSEPH HAROLD BATZLE
BY
Wheeler, Wheeler & Wheeler
ATTORNEYS

United States Patent Office 2,717,606
Patented Sept. 13, 1955

2,717,606

FEEDER ATTACHMENTS FOR WHOLE KERNEL CORN CUTTERS

Joseph Harold Batzle, Wauwatosa, Wis.

Application November 14, 1951, Serial No. 256,232

12 Claims. (Cl. 130—9)

My invention relates to improvements in feeder attachments for whole kernel corn cutters.

In a modern machine for cutting whole kernels from cobs of corn, an operator is called upon to select ears of husked corn from a tray and place each ear into a feed pocket, with the small end of the ear pointed in the proper direction for feed into a cutter head. Each machine operated by each operator has twin cutter heads and a separate pocket for each. These cutter heads are faced oppositely and since one operator must feed both cutter heads simultaneously, the operator is called upon to select ears of corn, determine the position of each ear so that the small end is placed properly in the pocket for the particular cutter head toward which the ear is fed; and the operator must do this at the rate of 48 ears for each pocket per minute or 96 ears per minute for the twin heads which are under the control of this single operator.

I have therefore devised a feeder attachment for twin cutter heads in a corn cutter as will be described below.

The objects of my invention are: To provide a feeder attachment to meet the above problem; to provide a feeder attachment for twin corn cutters which will obviate the necessity for operator coordination of left and right positioning of the small ends of ears in the machine; to provide a feeder attachment wherein the operator is only required to place ears successively in a feeder pocket with the small end of the ear always in the same direction; to provide a feeder attachment so operated in timed relation to the cutter heads which it feeds that alternate pockets are provided with feeder mechanism for dropping an ear into a particular cutter head and intervening pockets are so automatically actuated as to feed an ear into the other of the twin cutter heads for which my feeder is an attachment; to provide a feeder attachment with a pocket for each ear of corn but wherein only alternate pockets require special control devices for dropping an ear therefrom into the cutter head.

In the drawings.

Like parts are designated by the same reference characters throughout the several views.

As indicated above, my feeder is an attachment for a machine indicated generally at 15 and known in the trade as a "cutter." The principal operating elements of the machine are two cutter heads 16 and 17 mounted in such a way upon a pedestal 18 that the two cutter heads face each other. Between the cutter heads, the designer of these machines provides a worktable 20 wherein there are two feeder slots 21 and 22 into which corn on the cob is fed.

Figure 5:
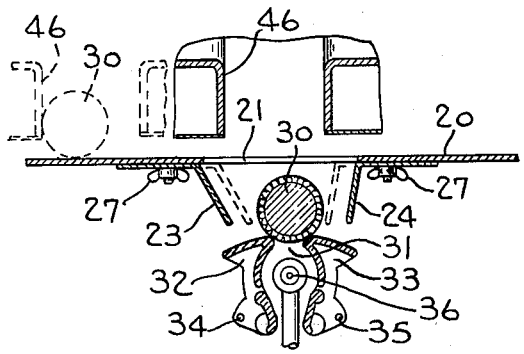
Fig. 5 is an enlarged section on line 5—5 of Fig. 1.

Immediately below the worktable and at either side of slot 21 or 22, are a pair of slot funneling members, 23 and 24 for slot 21, and 25 and 26 for slot 22. As indicated in Fig. 5, these slot funneling members are held to the underside of the worktable 20 by means of wing nuts 27, the bolts for which extend through slots in the funneling members as will be readily apparent from an examination of Fig. 5. Thus the funneling members may be adjusted to accommodate larger or smaller ears of corn 30 to be fed through the slots.

Although it forms no part of my invention, I shall here describe the machine parts below the slots 21—22 as shown in Fig. 5. Each ear 30, as it drops through the slot, takes its position in a gripper slot at 31 between grippers 32 and 33. These two grippers, pivoted at 34 and 35 respectively, are mounted to oscillate away from one another so as to drop the ear 30 into alignment with push rod 36. The push rod then thrusts the ear longitudinally into the cutter head. The cutter machine is so designed as to its driving elements for opening and closing the grippers 32 and 33 that the grippers are in position to support an ear 30 as shown in Fig. 5 during more than 45 seconds out of each minute, and the push rod 36, positioned centrally of the worktable, moves to the right and to the left alternately so as to push an ear out of the gripper under slot 21 and then out of the gripper under slot 22 in a continuous sequence.

From this description, it will be increasingly apparent that a cutter machine calling upon its operator to furnish ears of corn at the rate of 96 ears per minute to the slots 21 and 22 will tax the capacity of the operator to grasp each successive ear, determine which end is the small end, and to place the ear in the particular slot with the small end of the ear pointed outwardly toward the cutter head. It will be apparent from the following description of my invention that my improved attachment feeder simplifies the feeding problem and makes it possible for an unskilled operator to successfully feed a corn cutter having a multiple of cutter heads.

The principal structural element of my feeder attachment is a turntable 40 of approximately the same diameter as the worktable 20. Centrally of the worktable 20 and mounted to the frame 41 of the machine 15, I provide a vertical stud 42 which provides the axis upon which my turntable 40 may revolve. A substantial hub 43, rotatably mounted with respect to stud 42, comprises the central element for my turntable and it is to the underside of this hub 43 that I secure a driven sprocket 44 by means of dowel pins 45 so that a chain drive to my turntable 40 may be connected to the operating mechanism of the cutter machine as will be hereinafter described.

Figure 4:
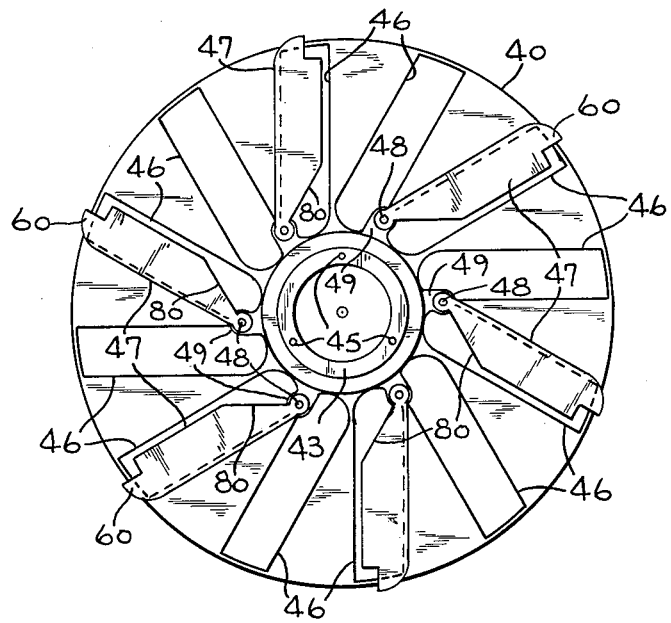
Fig. 4 is a bottom view of my feeder.
Figure 7:
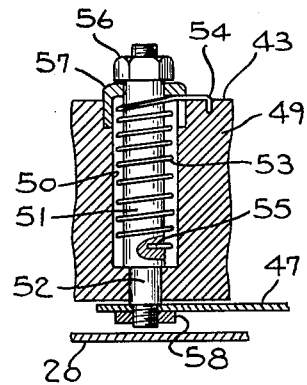
Fig. 7 is an enlarged section on line 7—7 of Fig. 2.
Figure 6:
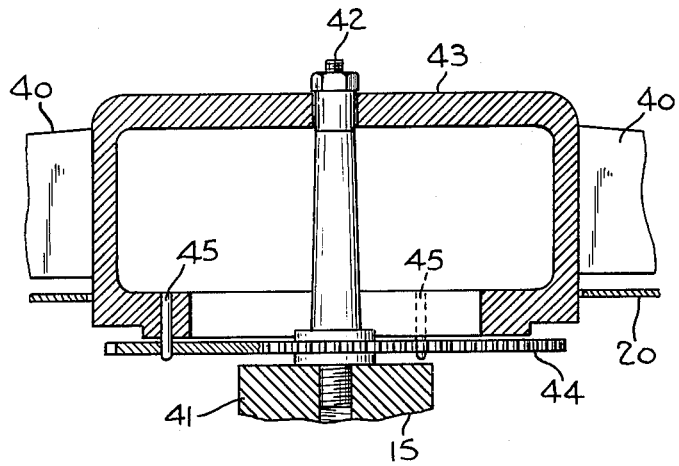
Fig. 6 is an enlarged section on line 6—6 of Fig. 1.

Somewhat offset from true radii of the circular turntable 40, I provide an even number of pockets 46, half of which are bottomless as seen clearly in Fig. 4, and the other half of which have retractible flipper bottoms 47. These flipper bottoms, shaped as shown clearly in Fig. 4, are pivotally mounted at 48 to bosses 49 forming part of the hub 43. Each of these bosses is bored and counterbored at 50 to receive a shoulder stud 51 mounted for free oscillation at 52 but controlled by torsion spring 53 anchored in the boss at 54 and secured to the stud at 55. A nut 56 on the stud holds a cap washer 57 in position as shown in Fig. 7, and at the bottom of the stud, the flipper bottom 47 is secured and keyed to the stud by means of a nut 58. This mounting for the flipper bottom 47 holds it securely for oscillation in a horizontal plane and each of the flipper bottoms is biased by spring 53 to "closed" position in which the flipper bottom holds an ear of corn in pocket 46. The outer end of each flipper bottom has a nose 60 extending beyond the outer periphery of the turntable 40. Adjacent the periphery of the turntable and mounted to the worktable 20 at 61 I provide a latch spring 62, the working end 63 of which is in position to contact the nose 60 of each flipper bottom as it is moved past the location shown in Fig. 2. The latch spring therefore opens each flipper bottom as it approaches rotatively a position over slot 22 in the worktable 20, but as the nose of the flipper bottom passes beyond the resilient latch spring 63, the torsion spring 53 controlling the flipper bottom urges it to closed position once more.

Figure 8:
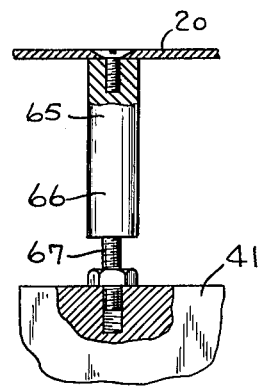
Fig. 8 is an enlarged section on line 8—8 of Fig. 1.
Figure 9:
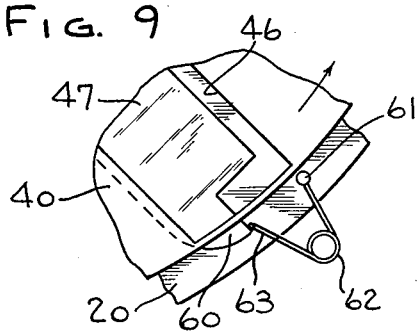
Fig. 9 is an enlarged fragmentary detail providing a bottom view of the actuator for the corn ear dropping mechanism of my feeder.

Ears of corn in the bottomless pockets of the turntable rest on the worktable 20. To support the worktable 20 in proper relationship to the underside of the turntable 40, I mount it upon adjusting stud-like legs 65 which are in turn supported by the frame 41 of the cutter machine (see Fig. 8). By means of the adjustment of spool 66 upon stud 67, I am able to fix the table 20 accurately under the turntable.

The main drive of the cutter machine 15 includes motor 70 with a universal jointed motorshaft 71. There is a worm drive 72 for the cutter heads 16—17 and the other working parts of the machine 15. This main drive for the cutter heads is connected through a vertical shaft 73. To drive my attachment feeder, I extend the shaft 71 through a universal joint at 74 to a worm drive 75 which has its bearing and enclosure in a case 76. Out of this case 76, I provide a vertical shaft 77 which extends upwardly to a driving sprocket 78 connected to driven sprocket 44. Thus there is provided for my turntable 40 a positive drive which is timed in relationship to the movements of the pusher 36 and the other machine members involved in the timed feed of ears of corn into the cutter heads 16—17.

Figure 1:
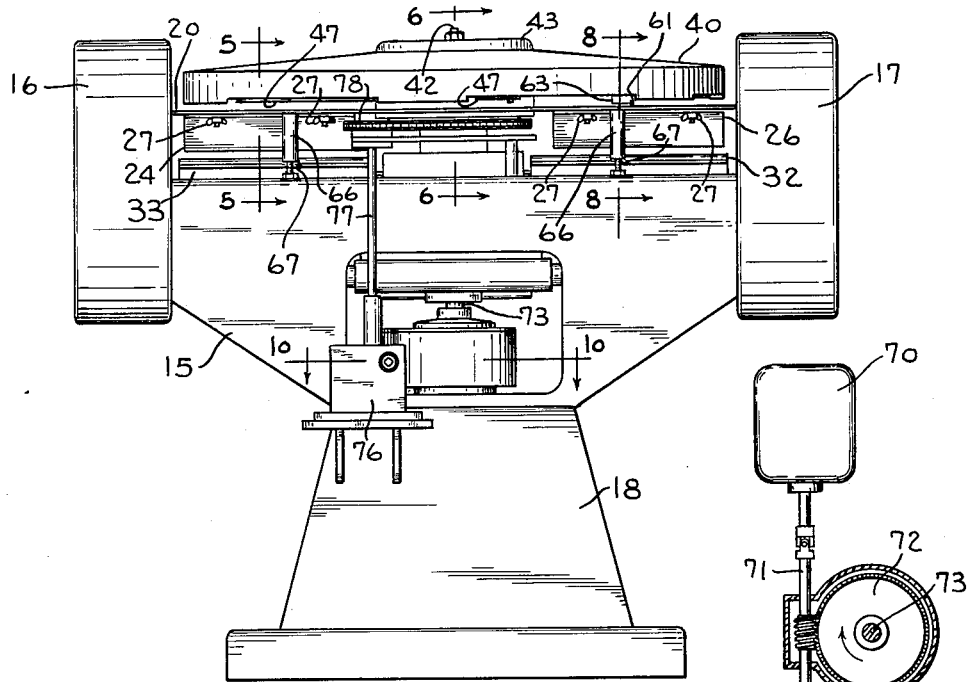
Fig. 1 is a front elevation of a corn cutter machine with two cutter heads and with my feeder attachment incorporated therewith.
Figures 2, 10:
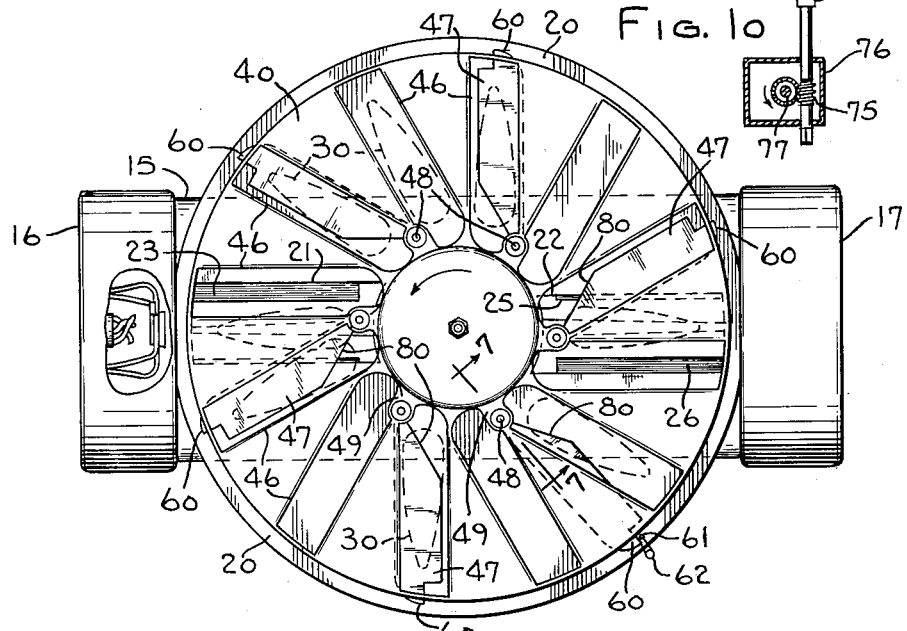
Fig. 2 is a plan view of the machine shown in Fig. 1.
Fig. 10 is a section on line 10—10 of Fig. 1.
Figure 3:
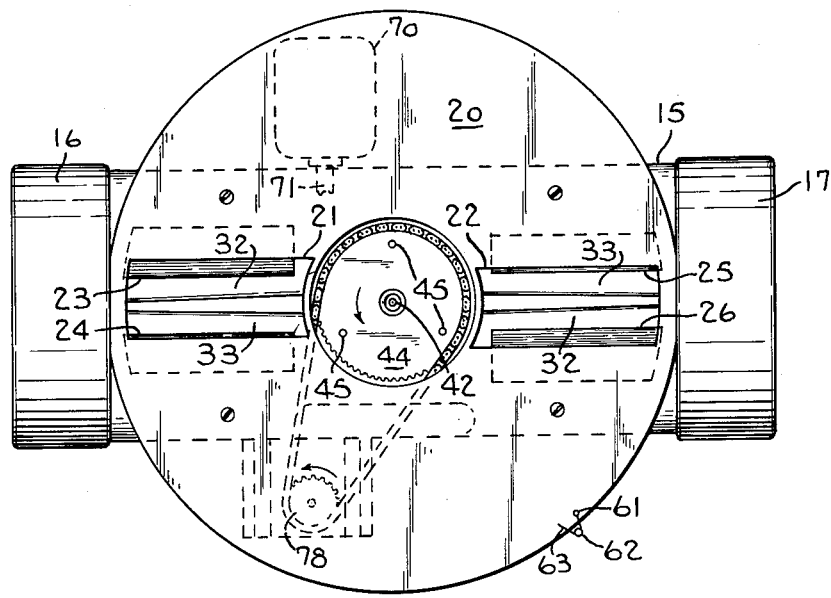
Fig. 3 is a view similar to Fig. 2 but with my feeder attachment removed.

My feeder attachment operates as follows:

The operator places ears of corn into pockets 46 as indicated in dotted lines in Fig. 2 where it will be seen that the ears are all pointed outwardly, that is, with the small ends of the ears pointed toward the periphery of my turntable. This is the only requirement which the human operator must meet. Each pocket is provided with one ear of corn and the ear is always laid in the same direction. An ear in a pocket having no flipper bottom rolls upon the table 20 until it reaches slot 21 and the ear then drops into the slot and into the position shown in Fig. 5. An ear in a pocket 46 which has a flipper bottom is carried on past the slot 21 and continues to be carried in the pocket 46 until the nose of the flipper bottom for that particular pocket contacts latch spring 63. In the continued rotation of the turntable 40, the latch spring 63 holds the flipper bottom and the flipper bottom is rotated about the axis of its spring biased shoulder pin 51 to which it is keyed. Latch spring 62 is stronger than spring 63 in view of the moment arm represented by the length of the flipper bottom, and as the turntable rotates, the flipper bottom finally is withdrawn from the position under its pocket 46 so as to drop the ear of corn therefrom into slot 22 in the table 20.

Since the alternate pockets 46 are equipped with flipper pockets, one half of the ears supplied to the turntable are dropped into slot 21 and the other half are dropped into slot 22, and since these slots are approximately diametrically opposite each other in the rotation of the turntable, the smaller ends of the ears are always properly placed outwardly in readiness for feeding operation to the particular cutting head.

From the above description, it will be obvious that the operator is relieved of a constant strain and concentration and coordination required in the old worktable operation where alternate placement of ears is required.

Because the pintle at 48 about which the flipper bottom oscillates is at the trailing edge of the slot with which the flipper bottom cooperates, there is a tendency, at the time the nose 60 contacts the latch spring 63, for the nose to move outwardly radially of the turntable during its initial contact with the latch spring. Thus the contact of the latch spring with the nose 60 is prolonged, and it will be noted that the flipper bottom is clipped at 80. This gives double assurance that the flipper bottom will clear the pocket 46 completely before the nose 60 loses its contact with spring 63. Then when the ear of corn has dropped and the nose has passed the latch spring 63, the torsion spring 53 has ample bias to return the flipper bottom to a position under the pocket 46 in readiness for reception and retention of another ear of corn. Obviously the corn is so fed to the pockets of the turntable that the uncontrolled, bottomless pockets roll their ears on the table 20 and drop them into the first slot 21, and the flipper bottomed pockets carry their ears of corn around to the next slot, which is diametrically opposite the first slot in respect to the circular turntable.

I claim:

1. The combination with spaced corn cutter heads for action upon axially aligned ears of corn to be fed outwardly small end first from fedeing positions located between said heads and a feeding table between the heads having a solt for each feeding position, of a turntable for rotation over the feeding table with a plurality of elongated pockets in said table, alternate pockets being open to the feeding table to feed an ear of corn to a first slot in the feeding table and intervening alternate pockets having flipper bottoms to retain an ear of corn in the pocket as it passes over said first slot in the table, said flipper bottoms having means biasing the bottoms to closed position, and release means positioned to actuate the bottom against said bias and drop the ear out of its pocket when the turntable passes over a second slot in the feeding table.

2. The combination of claim 1 wherein the slots are positioned diametrically opposite one another with respect to said turntable.

3. A corn cutter comprising a pair of opposed corn cutting devices having oppositely moving plungers and a corn feed table with angularly spaced slots registering with said devices to receive ears of corn to be positioned in advance of the respective plungers, in combination with means for delivering ears of corn having all of their ends pointing in the same direction to lie in opposite positions in the slots of the respective devices, said means comprising a turntable having pivotal supporting means centered between said devices and provided with an annular series of pockets adapted in the course of turntable rotation to register with the respective slots of said devices, alternate pockets being open to pass directly to the surface of the feed table the ears of corn placed therein and to cooperate with said table to feed said ears across the feed table to drop into the first of said slots with which their respective pockets register, said turntable being provided with valve means underlying its intervening pockets for supporting across said first slot ears of corn placed in said intervening pockets, and means disposed adjacent the path of turntable rotation and having a valve actuating member for retracting each successive valve after it has passed said first slot to release the ears of corn in said intervening pockets for delivery into the next encountered slot of the feed table.

4. The combination with a turntable provided with a central pivotal support and having a central portion and pockets comprising elongated slots generally tangential to and extending outwardly from said central portion and opening through said turntable, of a feed table underlying the turntable and provided with a port with which said pockets register in the course of the turntable rotation, the feed table and turntable being in sufficiently close proximity so that a workpiece placed in a turntable pocket will rest on the feed table to be advanced thereon by turntable rotation, said turntable being further provided with additional pockets having valve means comprising a plate having a pivotal connection with the turntable and releasably adapted to support workpieces free of contact with the feed table whereby workpieces placed in said additional pockets will traverse said underlying feed table port without entering therein, a second feed table port, and means adjacent the path of turntable rotation and with which said plate is engageable to pivot said plate to a generally radial work discharging position for the discharge into said second port of a workpiece from the pocket having such valve means.

5. For use with a machine having a work table provided with a plurality of openings for articles to be fed into the machine, an attachment comprising a turntable and a mounting on which the turntable is rotatable in spaced relation to the worktable, said turntable being provided with a central portion and with a series of openings comprising elongated slots extending generally tangentially outwardly from said portion, said slots being successively registrable with the worktable openings in the course of turntable rotation, certain of said slots being open toward the worktable to cooperate therewith in feeding articles along the worktable into one of said worktable openings, and certain other slots being provided with retractable bottoms which comprise elongated plates pivoted to the turntable adjacent the trailing edge of the turntable slots for movement in the plane of turntable rotation, to support articles contained therein for movement beyond said one worktable opening, and means for retracting said bottoms adjacent another of said worktable openings.

6. An attachment for a corn cutting machine having spaced corn cutter heads for action on corn which must be presented to such heads with their small ends in opposite directions, the machine being provided with elongated feed openings over the respective heads, said attachment comprising a feeding turntable pivoted between said openings in which ears of corn may all be placed with the ears in the same direction for automatic delivery in opposite directions through the respective openings leading to said heads, the turntable having elongated corn receiving pockets, valve means connected with the turntable and retractably associated with pockets thereof for the support of corn deposited in said pockets, and means for retracting said valve means for the discharge of corn from a pocket which has passed over one of said openings and registers with the other thereof, said attachment comprising means for discharging corn ears from selected pockets into said one opening, whereby corn ears from said selected pockets is deposited in said one opening and corn ears in other pockets pass over said one opening and are deposited in the other opening with their small ends in the opposite direction from the corn ears deposited in the one opening, the change of direction being by reason of turntable rotation.

7. A duplex corn cutting machine comprising heads for operating on ears of corn having their small ends projecting in opposite directions, in combination with a feed table having openings over the respective heads, and a turntable pivoted between said heads for rotation over the feed table and having pockets elongated for corn ear reception and successively registering with said openings in the course of turntable rotation, alternate pockets being provided with means for continued support of corn ears during passage over one of said openings and for release of such corn ears for discharge into the other of said openings, the intervening pockets opening for discharge of corn ears into the first opening traversed by said pockets, whereby corn ears placed in the pockets with all of their small ends in the same direction will be delivered through the respective openings to the cutter heads with their small ends in opposite directions in the course of turntable operation.

8. The device of claim 7 in which the pockets discharging corn ears into the first opening traversed thereby comprise open slots, the turntable being in sufficient proximity to the feed table for the support on the feed table of corn ears disposed in said open slots until such corn ears register with said first opening.

9. The device of claim 7 in which the supporting means with which alternate pockets are provided comprise valve plates pivoted to the turntable and normally disposed beneath respective pockets for the support of corn ears therein and means fixed in the path of rotation of the turntable and engaged in the course of such rotation for displacing said plates to release corn ears supported thereby.

10. The combination with a corn cutter machine having a plurality of heads provided with feed openings and requiring that corn be placed therein with the small ends of the ears in opposite directions, of means for delivering ears to said feed openings with their small ends in opposite directions from a point at which said ears have their small ends all in the same direction, said means comprising a turntable pivoted between said openings and having feed pockets registrable with successive openings in the course of turntable rotation, and means effective in the course of turntable rotation for supporting alternate ears for the traverse of one of said openings and discharging said ears into the other, and for supporting intervening ears only to a point of discharge into said one opening.

11. The device of claim 10 in which the supporting means for alternate ears comprise valves associated with respective openings and retractable from corn ear supporting position therebeneath, said valves being mounted on the turntable and having actuators including a fixed stop in the path of turntable rotation and engaged to displace said valves after said one opening has been traversed by corn ears supported by the said valves.

12. For use with spaced corn cutter heads having receiving openings to which ears of corn must be presented with their small ends in different directions, a rotary conveyor for the oriented delivery of the ears to said openings and to which the ears may be delivered with their small ends all in the same direction, said conveyor comprising a turntable having ear-receiving pockets elongated generally radially and registrable with said openings in the course of turntable rotation, alternate pockets having normally closed bottom means, and means adjacent one of said openings for displacing successive bottom means for the discharge of ears from said alternate pockets, and means underlying the turntable and terminating at the other of said receiving openings for supporting ears in the pockets intervening between those provided with said bottom means, said ears dropping into said other receiving opening in properly oriented position therein upon registration with said other opening during turntable rotation.

References Cited in the file of this patent

UNITED STATES PATENTS

| Number | Name | Date |
| --- | --- | --- |
| 273,457 | Brown | Mar. 6, 1883 |
| 835,066 | Hampton | Nov. 6, 1906 |
| 858,201 | McCoy | June 25, 1907 |
| 1,008,925 | Pribil | Nov. 14, 1911 |
| 1,336,304 | Leumann | Apr. 6, 1920 |
| 1,510,968 | Wadell et al. | Oct. 7, 1924 |
| 2,001,457 | Douthitt | May 14, 1935 |